MAGNETIC MEMORY DEVICE

Filed Jan. 19, 1962

WITNESSES

Edwin C. Bassler

Laurence L. Lerner

INVENTORS

Richard D. Olsen, Raymond J. Radus and Marc A. Nerenstone

BY R. G. Brodahl

ATTORNEY

United States Patent Office 3,228,013
Patented Jan. 4, 1966

3,228,013
MAGNETIC MEMORY DEVICE

Richard D. Olson, Jeannette, and Raymond J. Radus, Monroeville, Pa., and Marc A. Nerenstone, Washington, D.C., assignors to Westinghouse Electric Corporation, East Pittsburgh, Pa., a corporation of Pennsylvania Filed Jan. 19, 1962, Ser. No. 167,359
8 Claims. (Cl. 340—174)

In general this invention relates to a simple magnetic memory device, more particularly, to a magnetic memory device which utilizes the inherent characteristics of soft ferromagnetic materials.

A ferromagnetic material must have atoms whose electron arrangement is such that magnetism is created. The atoms having these magnetic characteristics are grouped into regions called domains. In these domains it is equally probable that magnetism will occur in any one of six directions. In the iron crystal, for example, the atoms are at the corners of a cube shaped domain with one at the center. This arrangement is called a body-centered cubic lattice. The grouping in a nickel crystal differs from this by having an atom in the center of each face but none at the center of a cube. This is called a face-centered cubic lattice. A domain in an iron crystal in the absence of an external magnetizing force has its atomic magnetic moments all lined up in a single direction, the direction of one of the edges of the cubic lattice. In a face-centered crystal lattice such as nickel, the atomic magnetic moments are in the direction of a diagonal of the cube. In unmagnetized ferromagnetic materials, the domains are randomly oriented and neutralize each other. However, the magnetic forces are present. Application of an external magnetic field causes magnetism in the domains to be aligned so that their magnetic moments are added to each other and to that of the applied field.

With soft magnetic materials, such as iron, small external fields will cause great alignment, but because of the small restraining force only a little of the magnetism will be retained when the external field is removed.

With hard magnetic materials a greater external field must be applied to cause orientation of the domains but most of the orientation will be retained when the field is removed thus creating a larger permanent magnet which will have one north and one south pole.

Materials which may be grouped as soft range from cast iron which is one of the poorest to the iron nickel alloys which rank among the best. Alnico and barium-ferrite are examples of hard magnetic materials.

The present invention utilizes the above-mentioned characteristics of soft magnetic materials by providing two or more ferromagnetic paths having a common portion. A source of magnetomotive force such as a permanent magnet is used to supply flux to each of the paths. If one path has less reluctance than the other paths, the majority of the domains in the above-mentioned common portions will align themselves in the direction of the path having the least reluctance. They will remain so aligned until some external energy is applied to realign them in a different direction. Control of the external energy required to rotate the domain orientation in the common portion is all that is necessary to classify the device as a memory unit. In the present invention, this domain orientation is done mechanically by physically removing a portion of the magnetic paths.

It is the general object of this invention to provide a more simple magnetic memory device.

Another object is to provide a simple magnetic memory device which remembers the orientation of the domains in a common portion of a plurality of ferromagnetic paths until some external energy is applied to realign the domains.

Another object of the invention is to provide a more simple method of determining which of two keepers was first applied to complete a ferromagnetic path by utilizing the remanence property of ferromagnetic materials.

Another object of this invention is to provide a more simple magnetic memory device which utilizes the high coercive force of permanent magnet materials and the domain characteristics of soft magnetic materials.

Still further objects and the entire scope of applicability of the present invention will become apparent from the detailed description given hereinafter. It should be understood, however, that the detailed description while indicating a preferred embodiment of the invention is given by way of illustration only since various changes and modifications within the spirit and scope of the invention will become apparent to those skilled in the art from this detailed description.

For a better understanding of the invention reference should be had to the accompanying drawings, wherein.

Figure 1A:
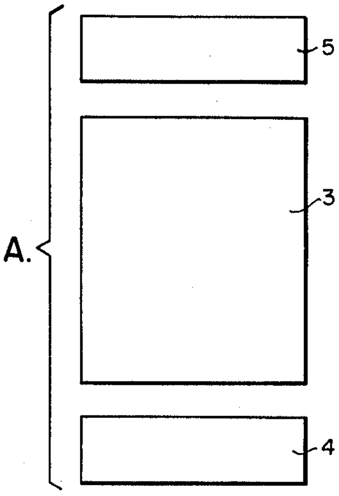
FIGURE 1A is a front view of the apparatus of the present invention.
Figure 1B:
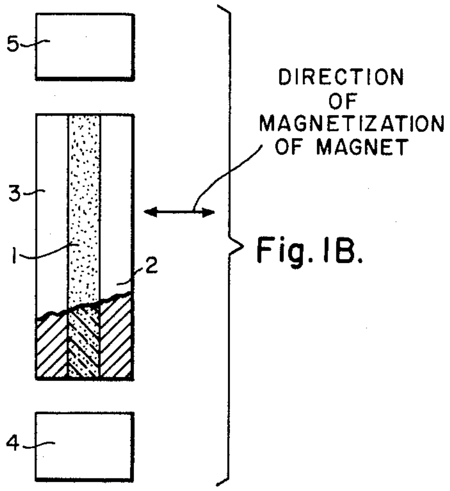
FIG. 1B is a right-side view of the apparatus of the present invention.

In FIG. 1, there is shown a ceramic permanent magnet 1 used as a source of magnetomotive force sandwiched between two soft ferromagnetic bars 2 and 3. The permanent magnet 1 is magnetized in a direction perpendicular to the soft magnetic bars 2 and 3. Two keepers 4 and 5, also made of soft magnetic materials, are placed so that they may complete separate parallel ferromagnetic paths through the common portion consisting of bars 2 and 3 and permanent magnet 1. The device comprising the ceramic permanent magnet 1 and the soft magnetic bars 2 and 3 is capable of holding a cold-rolled low carbon steel keeper against the pole faces with a pull of approximately 26 pounds. The high coercive force of the barium-ferrite material permits the magnetic length to be smaller for the same pole than magnets of other materials. In addition, the flux density at the pole faces of the device shown in FIG. 1 can be raised to five times the flux density in the magnet by making the area of the pole face smaller than the magnetic area. The combination of these two design features yields a relatively small magnet which has a high flux density at the pole faces but which has very little "reach-out" power. As stated previously, the device can hold one keeper, for instance keeper 4, with a pull of approximately 26 pounds. If another keeper was placed on the magnetic structure in FIG. 1, such as keeper 5, it would not be held with much force (i.e. less than 26 pounds); that is it would be held with less force than the keeper 4 only if it were placed on the structure after keeper 4 had been placed on the device.

Figure 2A:
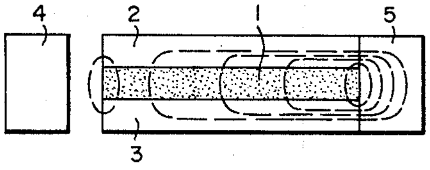
FIGS. 2A and 2B show the use of the apparatus shown in FIG. 1 in accordance with the teachings of the present invention.
Figure 2B:
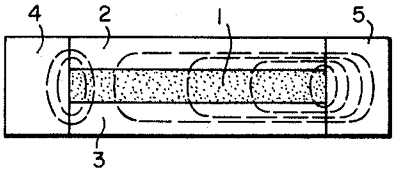

FIG. 2A shows what occurs when one keeper is placed on the device. In this figure it can be seen that the domains of the soft magnetic material in the bars 2 and 3 have aligned themselves in the direction of the flux path including permanent magnet 1, bar 2, keeper 5 and bar 3. Very few lines of flux are present in the air gap between the keeper 4 and the device. In FIG. 2B there is shown what happens when the keeper 4 is placed against the device. Though there now appear to be two ferromagnetic paths which are physically and magnetically equal, the flux does not divide equally between the two paths. The first path mentioned previously includes keeper 5 and the second path includes permanent magnet 1, bar 2, keeper 4 and bar 3. The domains of the soft magnetic material in bars 2 and 3 have aligned themselves in the direction of the path including keeper 5. Therefore, this is still the low reluctance path for the flux supplied by the permanent magnet 1 and very little will be supplied to the path including the keeper 4.

This device can thus be used to distinguish among four possible "states of being" and for one of those states two alternatives of priority. The four states are; (1) no keepers; (2) keeper 4 in contact with the device, keeper 5 not in contact with the device; (3) keeper 5 in contact with the device, keeper 4 not in contact with the device; (4) keepers 4 and 5 both in contact with the device. Two alternatives of priority for state (4) are; (a) keeper 5 placed before keeper 4, and (b) keeper 4 placed before keeper 5.

In a sense the above description qualifies as the design of a memory device or a storage element for digital information, i.e. the device remembers which keeper was placed on it first.

In FIG. 2B, if keeper 5 were removed the domains would align in the path including keeper 4, and if keeper 5 was again placed against the device, it would be held with much less force than keeper 4.

While one best known embodiment of the invention has been illustrated and described in detail, it is particularly understood that the invention is not limited thereto or thereby.

We claim as our invention:

1. In a permanent magnet memory device having at least two stable memory states, the combination of: a permanent magnet to provide a source of magnetic flux, a pair of pole pieces, said permanent magnet being sandwiched between said pole pieces, a first keeper disposed first over one side of said permanent magnet between said pole pieces to establish a first magnetic flux path having a low reluctance and defining a first memory state, a second keeper disposed subsequently over the other side of said permanent magnet between said pole pieces after said first keeper has been disposed and providing a second magnetic flux path having a higher reluctance than said first magnetic flux path, and magnetic flux switching means for increasing the reluctance of said first magnetic flux path greater than the reluctance of the second flux path to thereby increase the amount of flux passing through said second magnetic flux path so that a second magnetic memory state is defined.

2. A magnetic memory device comprising a source of magnetic flux, a first magnetic circuit for said source, means for completing a second magnetic circuit for said source, the majority of the magnetic flux generated by said source remaining coupled to said first circuit when said second circuit is completed, and means controllable thereafter for transferring the majority of the flux generated by said source to said second circuit.

3. A magnetic memory device comprising a source of magnetic flux, a pair of pole pieces, said source being disposed between said pole pieces, a member movable to a position between said pole pieces, a first magnetic circuit for said source independent of said member, a second magnetic circuit for said source completed when said member is moved between said pole pieces, the majority of the flux generated by said source remaining coupled to said first circuit when said member is first moved into position between said pole pieces, and means thereafter controllable for transferring the majority of the magnetic flux generated by said source to said second circuit.

4. A magnetic memory device comprising a magnet, a pair of pole pieces, said magnet being disposed between said pole pieces, a keeper movable into a position between said pole pieces, a first magnetic circuit independent of said keeper, a second magnetic circuit including said keeper, the reluctance of said second magnetic circuit being higher than the reluctance of said first magnetic circuit when said keeper is first moved into position between said pole pieces, and means thereafter controllable for increasing the reluctance of said first magnetic circuit to thereb effect a transfer of magnetic flux to said second magnetic circuit.

5. A magnetic memory device comprising a magnet disposed between a pair of pole pieces, a pair of keepers individually movable into positions between said pole pieces and on opposite sides of said magnet, a first magnetic path of low reluctance being completed when one of said keepers is moved into position between said pole pieces, a second magnetic path being completed when said other keeper is then moved into position between said pole pieces, said second magnetic path being of higher reluctance than said first path, and said second magnetic path becoming of low reluctance when said one keeper is moved out of position between said pole pieces.

6. In a permanent magnet memory device, the combination of a permanent magnet operative to provide a source of magnetic flux, a pair of pole pieces, with said permanent magnet being disposed between said pole pieces, a pair of keepers placed between said pole pieces and opposite each other such that first and second magnetic flux paths are thereby provided respectively through each of said keepers, with one of said keepers being first placed between said pole pieces so that one of said paths including said one keeper acquires a lower reluctance than the other of said paths, said permanent magnet providing magnetic flux to said paths in relation to the reluctance of each of said paths, and magnetic flux switching means for increasing the reluctance of said one magnetic flux path above the reluctance of said other path.

7. In a permanent magnet memory device operative in at least two stable states, the combination of a permanent magnet to provide a source of magnetic flux, a pair of pole pieces positioned such that said permanent magnet is disposed between said pole pieces, a pair of keepers positioned to be disposed between said pole pieces and opposite each other, said pole pieces and keepers comprising a soft magnetic material, first and second magnetic flux paths being provided through said keepers respectively with a first of said keepers being placed in position prior to the second keeper such that said first of said paths including said first keeper thereby acquires a lower reluctance than the second of said paths including said second keeper to define one stable state, said permanent magnet providing magnetic flux to each of said paths with said magnetic flux dividing in relation to the relative reluctance of said paths, and flux switching means for increasing the reluctance of said first flux path so that the second of said paths becomes the lower reluctance path to define a second stable memory state.

8. In a permanent magnet memory device operative in at least two memory states, the combination of a permanent magnet operative as a source of magnetic flux, a pair of pole pieces coupled to said permanent magnet, said permanent magnet being sandwiched between said pole pieces, a first keeper positioned initially at one end of said permanent magnet and between said pole pieces to provide a relatively low reluctance first magnetic flux path and to establish thereby a first memory state, a second keeper positioned subsequently at the other end of said permanent magnet and between said pole pieces to provide a second magnetic flux path having a higher reluctance than said first magnetic path, and magnetic flux switching means operative to increase the reluctance of said first flux path greater than the reluctance of said second flux path to thereby establish a second memory state in said device.

References Cited by the Examiner

UNITED STATES PATENTS

| | | | |
|---|---|---|---|
| 2,805,407 | 9/1957 | Wallace | 340—174 |
| 3,146,381 | 8/1964 | Moreau | 340—174 X |

OTHER REFERENCES

Pages 72–77, 182, 184 and 186, February 1947—Merrill, F. W., Performance of the New Alnico Permanent Magnet Materials, in Electrical Manufacturing.

IRVING L. SRAGOW, *Primary Examiner.*

J. W. MOFFITT, *Assistant Examiner.*